United States Patent [19]

Renaud

[11] Patent Number: 4,671,840

[45] Date of Patent: Jun. 9, 1987

[54] PROCESS FOR INTERNALLY LINING A DUCT, A LINING INSTALLATION USING THIS PROCESS AND DUCTS PROVIDED WITH A LINING IN ACCORDANCE WITH THIS PROCESS

[75] Inventor: Alain P. Renaud, Montfermeil, France

[73] Assignee: Coopetanche S.A., Melun, France

[21] Appl. No.: 634,952

[22] Filed: Jul. 27, 1984

[51] Int. Cl.⁴ .................. B29C 63/28; B29C 63/34
[52] U.S. Cl. .................. 156/287; 156/294; 264/269; 264/516
[58] Field of Search ............ 156/156, 285, 71, 287, 156/293, 294, 499; 264/36, 516, 521, 269; 138/97, 141

[56] References Cited

U.S. PATENT DOCUMENTS

| | | | |
|---|---|---|---|
| 889,796 | 6/1908 | Lowther | 138/175 |
| 3,080,269 | 3/1963 | Pollock et al. | 156/287 X |
| 3,258,377 | 6/1966 | Scott | 156/156 |
| 3,511,734 | 5/1970 | Darrow | 156/287 |
| 3,758,361 | 9/1973 | Hunter | 156/294 X |
| 4,361,451 | 11/1982 | Renaud | 156/287 X |
| 4,410,391 | 10/1983 | Thomas et al. | 156/294 X |

Primary Examiner—Donald E. Czaja
Assistant Examiner—Ramon R. Hoch
Attorney, Agent, or Firm—McAulay, Fields, Fisher, Goldstein & Nissen

[57] ABSTRACT

An internal lining for ducts (C) is provided by introducing into one end of the duct an assembly (E) which comprises a sleeve (5) and an inflatable system (2) and which is provided with heating means for applying a sheath (1) impregnated with a resin against the inner wall of said duct (C). After partial polymerization at least of the resin, the sheath (1) adheres to the inner wall of the duct. The system (2) is then deflated, the heating stopped and the assembly (E) withdrawn from the duct. With the length of the duct a multiple of the length (l) of an assembly (E), the operation is repeated by introducing into the duct successively a multiplicity of sheaths (1) until the inner wall of the duct (C) is provided with an internal lining over the whole of its length.

18 Claims, 7 Drawing Figures

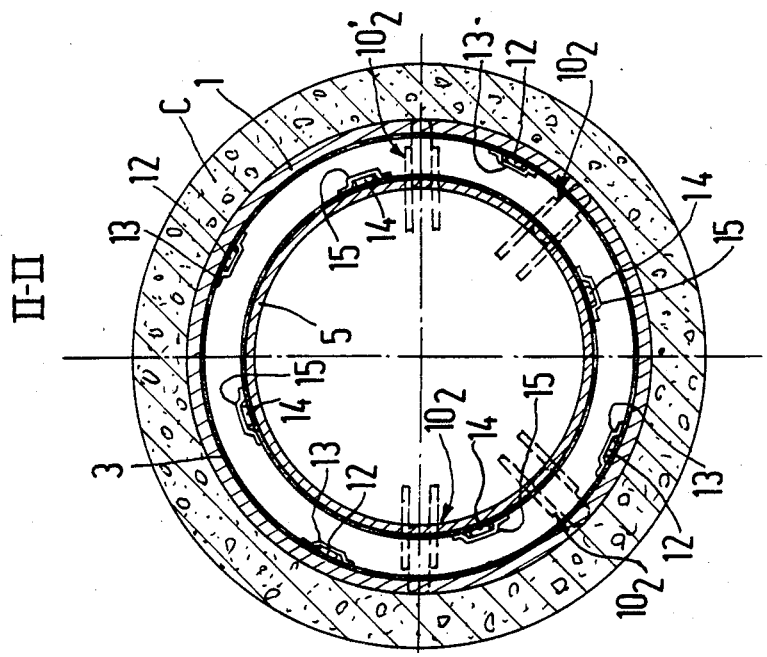
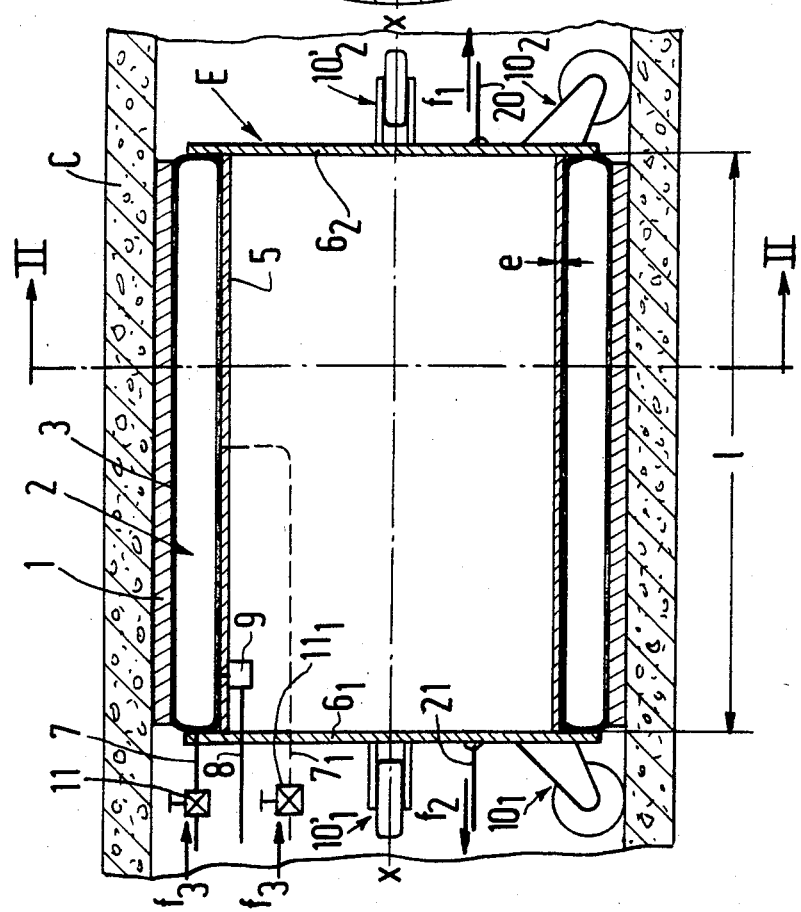
FIG.1
FIG.2

PROCESS FOR INTERNALLY LINING A DUCT, A LINING INSTALLATION USING THIS PROCESS AND DUCTS PROVIDED WITH A LINING IN ACCORDANCE WITH THIS PROCESS

The present invention relates to a process for internally lining a duct made from concrete, metal, ceramic, etc . . . which for example, is particularly advantageous for lining ducts of large diameter and having considerable length. This invention also relates to the installations for lining ducts using the process of the invention as well as the ducts provided with the lining in accordance with said process.

In known processes, a sheath is used for lining the inside of a continuous duct over the whole of the length of the duct. The sheath is introduced therein by pulling or by driving it along the duct by means of a pressurized fluid. The duct is generally at least partially impregnated beforehand with an epoxy resin for example, which makes it adhere by its outer wall to the inner wall of the duct, during polymerization of said resin, in general by the action of a pressurized fluid. These processes require therefore a complicated equipment and system for impregnating the material forming the sheath. Furthermore, it is difficult to pull or introduce a single long and heavy sheath along the duct, particularly when it is a question of relatively long ducts with a large diameter. So that the sheath, in this case, is not too heavy, its thickness must be fairly small. The sheath is then not very strong and risks tearing or other damage during its passage in the duct, which makes it only partially fluid tight. Furthermore, its application against and adherence to the inner wall of the duct is made difficult because a generally hot pressurized fluid must be applied over the whole of the considerable length of the duct. The application pressure exerted by this fluid and its temperature tend to vary considerably from one end of the duct to its other end, which often results in an uneven polymerization of the resin and a poorly controlled adherence of the sheath to the inner wall of the duct.

The object of the present invention is to remedy these drawbacks and to provide a process for internally lining a duct, such as a duct of large diameter and having a great length, this process being efficient, easy to carry out and allowing high strength sheath to be used.

In accordance with the present invention, the process is characterized in that it comprises, in combination, the following steps:

(i) the inner wall of the duct may be cleaned and scaled;

(ii) at least a first sheath for lining the inside of the duct having a length possibly less than the length of the duct to be lined is prepared with a complex material, said material being at least partially impregnated with a resin either before, or after formation of said sheath, this sheath being possibly heated during at least a partial impregnation thereof with said resin;

(iii) said first sheath is introduced into at least one part of the duct, possibly simultaneously with an inflatable system for applying said sheath against the inner wall of the duct which may be a flexible and fluid tight sheet or membrane, so that said system is located inside the sheath, electric heating means being possibly mounted fixedly on at least the inner wall of said membrane (or sheet);

(iv) said system is inflated by means of a pressurized fluid and thus applies said sheath against at least a first part of the inner wall of the duct;

(v) if required, during inflation of said system, said electric heating means may be operated for increasing the temperature and speeding up polymerization of the resin;

(vi) after at least the partial polymerization of the resin, said system is deflated and withdrawn; the sheath adheres to the inner wall of the duct, its inner face being smooth and fluid tight;

(vii) a second sheath, possibly identical to the first sheath, may be prepared in the same manner as said first sheath and may be introduced, as well as said system into said first part of the duct near said first sheath and applied against the inner wall of the duct, the junction between said first sheath and said second sheath being made fluid tight, the inflatable application system being deflated after at least the partial polymerization of the resin and withdrawn;

(viii) other successive sheaths may be introduced and applied against at least said first part of the inner wall of the duct until the whole of at least this first part of the duct is provided with an inner lining;

(ix) successive sheaths may be introduced into successive parts of the duct and applied against the inner wall of these parts of the duct in a way identical to that described in above points (ii) to (viii), so as to provide complete lining of the duct.

The sheath for lining at least partially the inside of the duct at least partially impregnated with a resin is disposed on the outer wall of a sheet which may belong to an annular inflatable sealing system. The system is in contact with the outer wall of a sleeve which may have any section whatever compatible with this section of the duct and which has sufficient rigidity so as not to collapse when a pressurized fluid is introduced into the sealed annular spaced defined at least partially by a sheet of said system. The sleeve is provided with at least two wheels or similar devices at each of its ends so as to be movable in the duct under a pulling force exerted on one or other of its ends. The sheath is applied to the inner wall of the duct through the action of a pressurized fluid introduced into said sealed system so as to inflate it. The sheath is applied after at least the partial polymerization of said resin, which polymerization is possibly speeded up by the action of electric heating means which are fixedly mounted at least on the inner wall of said sheet of said system. After application of the sheath to the inner wall of said duct, said sealed system is deflated and the mobile assembly: sleeve—inflatable application system, is withdrawn from the duct. A second sheath impregnated at least partially with resin is disposed on said sheet defining said uninflated system. The mobile assembly: sleeve—inflatable application system (sheet, space) and the sheath are introduced into the duct. The second sheath is applied against the inner wall of the duct so as to be adjacent to said first sheath. The joint between the first sheath and said second sheath are made fluid tight. This operation is repeated with successive other sheaths until the duct is completely lined.

The sealed system is in the form of an annular closed and sealed membrane formed from a flexible material, possibly elastic, such as polyethylene, polyvinyl, butyl and the like. Electric heating means are disposed on the inner walls of said membrane, said membrane is in controlled communication with a pressurized fluid source.

According to another embodiment, the inflatable sealed system is defined by the outer wall of the sleeve and by a flexible sheet, which may be elastic, whose front and rear ends are connected fixedly and sealingly to said outer wall of the sleeve. The sheet is made from polyethylene, polyvinyl, butyl, and the like. Electric heating means are disposed on the inner wall of said flexible sheet and, possibly, on the outer wall of the sleeve. The sealed space is in controlled communication with a pressurized fluid source.

The electric heating means are in the form of heating ribbons, known per se, which are disposed inside longitudinal chambers formed by strips welded by their lateral edges to supports such as the inner wall of the above mentioned membranes and, possibly, the outer wall of the sleeve.

Several mobile assemblies: sleeve—inflatable application system (membrane, sealed space) and the sheaths are disposed in the duct and connected together, the distance (A1) between two assemblies being slightly less than the length (A) of an assembly. The train thus formed is able to be moved in the duct after simultaneous application on the inner wall of the duct of the first lining sheaths carried by said mobile assemblies: sleeve—inflatable application system forming the train. The parts of the inner wall of the duct between two assemblies with lengths ($a_1$) are provided with sheaths, subsequently, during the second operation, when each of the assemblies: sleeve—inflatable application system, is loaded with a second sheath whilst the train is in a position withdrawn from the duct after application of said first sheaths to the inner wall of the duct.

According to a particular embodiment, more especially for sewers, the section of the duct intended to be provided with an inner lining comprises at least one larger part and at least one smaller part, such as in sewers, characterized in that the lining is carried out essentially in three steps, these steps being able to be carried out in any order:

(i) the part of the duct with the largest section is lined with a complex material impregnated at least partially with resin and shaped so as to be able to be applied to the inner wall of the duct thus forming a partial sheath of the duct. The partial sheath is placed on an inflatable application system disposed on a sleeve whose section is smaller but whose configuration may be substantially identical to the section of said wall of the duct. The sleeve comprises a base plate which has a width greater than the greatest width of the part of the sleeve carrying said inflatable system and said sheath. At least two wheels, rollers or similar devices are mounted on the edges of said base plate, such as at each longitudinal end of the plate, thus making the assembly: sleeve—inflatable application system and the sheath, mobile in said part of the duct under the action of a pulling force in the direction of the longitudinal axis of the duct. The wheels are placed on the set-backs between the largest section and the smallest section of the duct, these set-backs forming rolling path. Several assemblies: sleeve—inflatable application system and the sheath, may be hitched to each other for simultaneous application of several sheaths to the part of the inner wall of the above mentioned part of the duct. The application is carried out by introducing a pressurized fluid into said application system while heating, if required, said fluid and the resin by electric means. The sheaths are applied to the wall of said part of the duct by means of a flexible sheet which may be elastic—said sheet forming for example part of a closed membrane—until the resin has at least partially polymerized. When the sheaths adhere to the inner wall of said part of the duct, the inflatable system (s) is (are) deflated and the mobile assembly: sleeve—inflatable application system (or the train comprising several assemblies) is withdrawn from the duct. The assembly or assemblies is (are) again loaded with sheaths impregnated at least partially with resin so as to continue lining said part of the duct. These operations are repeated until said part of the duct is completely lined;

(ii) the part of the duct having the smallest section is provided with a lining by applying the process described in point (i) above;

(iii) the parts of the duct not yet provided with a lining, such as the rolling path, are provided with a sheath which may be applied manually;

(iv) the parts of the sheaths not yet applied to the walls of the duct by the action of the inflatable system may be applied manually;

(v) the joints between the different sheath parts are made fluid tight by bonding, by covering and other methods known per se.

In this embodiment, it is possible to fit the sewers—which have a high temperature—and to fit the duct with an internal lining before total polymerization of the resin, the total polymerization taking place during flow in the sewers because of the high temperature thereof.

The sleeve is at least partially formed from a synthetic material, such as polyvinyl, and is for example provided with a reinforcement. That is, it has a thickness (e) conferring thereon sufficient rigidity so as to prevent it from collapsing during application of the sheath against the inner wall of the duct. The synthetic material sleeve is possibly associated with or integrated in a metal structure.

The synthetic material sleeve is relatively flexible. Thus, it may be advantageously used in curved ducts. The mobile assemblies: sleeve—inflation system plus sheath in a train comprising several assemblies may, in this case, be very close to each other so as to fit the curve of the duct while having the general ressemblance of a caterpillar. The assemblies then possibly having a relatively small length.

In another embodiment, said sleeve (s) may be made from metal.

The composite material of the sheath comprises at least one assembly: an outer layer made from an unwoven glass fiber material, a glass fiber reinforcement, an intermediate layer made from another intermediate second layer made from an unwoven glass fiber material disposed on the other side (lower side) of the strengthening assembly and a flexible and tight sheet made from polyethylene, polyvinyl, butyl and or the like, fixedly and sealingly connected to said second lower layer of unwoven material; the thickness of the sheath reaching 25 to 30 mm.

Other advantages and features will become clear from the following description and the accompanying Figures, given by way of examples.

FIG. 1 shows schematically, in longitudinal section, a first embodiment of the sleeve—application system—sheath assembly introduced into a duct, such as used for implementing the process of the invention.

FIG. 2 is a section through line II—II of FIG. 1;

The same reference numbers are used in the drawings for identical or similar parts.

Figure 7:
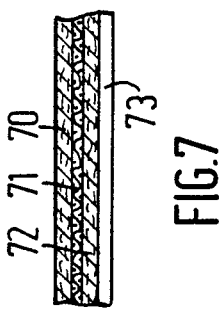
FIG. 7 shows schematically, in section, a composite material which may be used for internally lining the duct.

FIGS. 1 and 2 show a first embodiment using the process of the invention for internally lining ducts having a circular section; it being understood that the same embodiment may be used for lining ducts having an oval, square, rectangular, polygonal, section etc . . . Duct (C) shown in the Figures is made from concrete, but the process of the invention may also be used for metal, ceramic, synthetic material, ducts etc . . . This process is particularly advantageous for linings having large sections, for example a circular section having a diameter equal to or greater than 800 mm. However, this process is applicable for lining ducts of any diameter. In FIGS. 1 and 2 is shown a sleeve (5) made from metal or a synthetic material, such as polyvinyl, having if required a strengthening framework. The mechanical strength of sleeve (5), and consequently the thickness (e) of the wall of the sleeve (5) made from synthetic material, must be sufficient so that the sleeve does not collapse when a pressure is applied to its outer surface. However, the sleeve also has a certain flexibility so as to be able, if required, to fit the curvature of a duct. The length (1) of a sleeve (5) depends on the diameter (or the size of its section) and on the general configuration of the duct (straight or curved). That is, the sleeve being comparatively shorter in the case of a curved duct— than that of a straight duct. The length of sleeve (5) also depends on the weight of the lining sheath (1) impregnated at least partially in its thickness with an epoxy resin, for example, as was mentioned above. In all cases, the total length of the duct to be provided with a lining is a multiple of the length (1) of the sleeve (5). This sleeve is generally associated with a rigid structure, made for example from metal, which may comprise solid or annular plates ($6_1, 6_2$) at each of the ends of the sleeve (5). The structure (not shown in the drawings) and/or the plates ($6_1, 6_2$) support devices (10) provided with wheels or the like which are in contact with the inner wall of the duct. In FIGS. 1 and 2, two wheel devices ($10_1'$ and $10_2'$) are disposed on each side, extending outwardly in a plane transverse to the plane of each of the plates ($6_1, 6_2$), and two second wheel devices ($10_1, 10_2$) are mounted on the lower parts of said plates ($6_1, 6_2$) to form an angle of 45° with said first wheel devices ($10_1', 10_2'$). There are at least 4 devices ($10_1, 10_2$) and so four wheels for each sleeve (5) comprising, for example, a rigid structure and/or plates ($6_1, 6_2$). However, the number of devices (10) and so of wheels may be greater than four ($10_1, 10_2$) or eight ($10_1, 10_1'$, $10_2, 10_2'$). In particular, in the case of a relatively long sleeve (5), additional devices (10) may be mounted on the sleeve or the rigid structure at locations intermediate between the two ends of said sleeve, and an inflatable system (2) for applying the sheath (1) to the inner wall of the duct (C) is disposed on the sleeve (5). In the embodiment shown in FIGS. 1 and 2, this system (2) is in the form of a closed annular sealed membrane (3) which may be inflated by a pressurized fluid which may be introduced in the direction of one or more of the arrows ($f_3$) through ducts 7 or $7_1$. A valve 11 or $11_1$ is provided for automatically or manually controlling the flow of said fluid. Electric heating means may be disposed on the inner wall of the membrane (3), these means being supplied by wiring (8) and the distribution box (9). These means may be for example in the form of heating ribbons (12, 14), known per se, which are slid inside chambers disposed for example in the longitudinal direction of the membrane (3). The chambers are created by strips (13, 15) of a synthetic material fixedly connected to the inner wall of the membrane (3) by bonding or welding (with hot air, for example). A sheath (1) made from a composite material is disposed on said system (2) as is shown in FIGS. 1 and 2. The composite material comprises an outer layer (the one which is applied directly to the inner wall of the duct (C)) made from an unwoven material and, preferably, a reinforcing layer followed by another layer of unwoven material and, if required, at least one other reinforcing layer and a layer of unwoven material. If required, said composite material may comprise a last layer made from a flexible and smooth synthetic material. FIG. 7 shows by way of example a particularly advantageous composite material for it is very flexible and strong while having a comparatively low weight. This material consists of an outer layer (70) (the one applied directly to the inner wall of the duct (C)) made from an unwoven glass fiber material, followed by a strengthening layer made from glass fiber material or a glass fiber latticework. The last or inner layer is either the layer (72) made from an unwoven glass fiber material or a layer (73) following said layer (72); this layer (73) being made from a flexible and smooth synthetic material. The thickness of the sheath (1) depends on its desired mechanical strength, and also on the diameter of the duct (C) (size of the section of duct (C)), the length of the sleeve, etc.. Generally, for ducts with a diameter of the order of 800 mm, the thickness of the sheath (1) is between 10 to 20 mm, but for larger ducts, the thickness of the sheath (1) may reach and even exceed 45 mm.

The inner lining of duct (C) is achieved in the following way: the sleeve (5), the rigid structure and/or the plates ($6_1, 6_2$), the devices ($10_1, 10_2, 10_1', 10_2' \ldots 10_n, 10_n'$) and the inflatable system (2) for applying the sheath (1) against the inner wall of the duct (C) form a mobile assembly (E) in duct (C). This assembly (E) is outside the duct (C). The system (2) is deflated. The composite material (1) is at least partially impregnated in its thickness with an epoxy resin, for example.

If the composite material comprises an inner layer made from a smooth and flexible synthetic material, the sheath (1) is only impregnated with said resin over a part of its thickness, whereas, if the innner layer is made from an unwoven material, the sheath (1) may be impregnated through the whole of its thickness. The impregnation may be effected by any known method: injection; passing through a tank, etc . . . , before the sheath (1) is disposed on the system (2) or even afterwards. Since the sheath (1) is relatively short, impregnation thereof with the resin is fairly easy to carry out. It may be advantageous to heat the sheath (1) by said electric means during impregnation thereof with the resin. The sheath (1) before or after impregnation thereof with the resin) is laid on the inflatable application system (2) of the assembly (E). The assembly (E) and the resin impregnated sheath are pulled towards one of the ends of the duct (C) by a cable (20) in the direction of the arrow ($f_1$), for example. The pressurized fluid is fed into the membrane (3) through the duct (7 or $7_1$) and the electric heating means are, if required, switched on, —if they had not yet been switched on during impregnation of the sheath (1). The membrane (3) inflated by the pressurized fluid applies the sheath (1) against the inner wall of the duct (C). The rapid rise in temperature of said fluid and, consequently, of the resin allows rapid polymerization thereof. The system (2) is deflated, the heating stopped and the assembly (E) is withdrawn from the duct (C) by means of a cable (21) in the direction of the arrow ($f_2$). Rapid polymerization of the resin is particularly advantageous in the case of lining a duct (C) for drinking water whose temperature is fairly low (generally of the order of about 5° to 20° C.). If, on the other hand, the duct (C)) is intended for flowing a hot liquid, the mobile assembly (E) may be withdrawn as soon as the sheath (1) adheres to the inner wall of the duct (C). While such early withdrawal of the mobile assembly may result in only partial polymerization of the resin, it is the high temperature of the liquid flowing in the duct which causes total polymerization after the duct (C) has been brought back into service. In some cases, suitable polymerization of the resin may even be obtained without using the electric means. After withdrawing the assembly (E) from the duct (C), with the system (2) deflated and the heating stopped, new impregnated sheath (1), for example, is disposed on the assembly (E). This latter assembly and the new sheath are pulled towards one of the ends of the duct (C) by the cable (20) in the direction of the arrow ($f_1$) as far as the first sheath (1) already applied against the inner wall of the duct (C). The membrane (3) is then inflated, the electric heating possibly switched on and the new sheath is applied to the inner wall of the duct (C) so as to be adjacent to the first sheath already introduced beforehand. When the new sheath adheres to the inner wall of the duct (C) (polymerization of the resin being total or partial), the system (2) is deflated, the electric heating stopped and the assembly (E) again withdrawn from the duct (C). This partial lining operation is repeated as often as required until the duct (C) is completely lined. The joints between the successive sheaths are sealed by any known means: bonding, covering, etc . . . , this operation being carried out manually if required.

Figure 5:
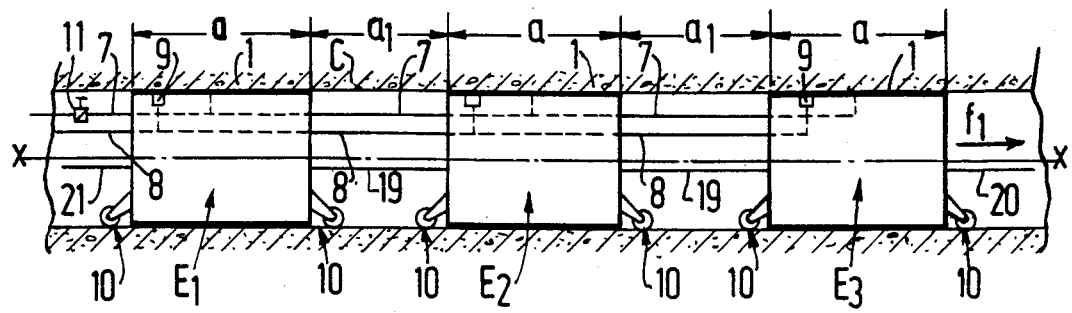
FIG. 5 shows schematically the use of a train of sleeve—application system—sheath assemblies for internally lining a duct.

As is showun in FIG. 5, it is possible to hitch several assemblies ($E_1, E_2, E_3 \ldots E_n$) together by means of cables (19), for example, for forming a train. When each of said assemblies ($E_1, E_2, E_3 \ldots E_n$) is loaded with a sheath ($1_1, 1_2, 1_3, \ldots 1_n$), for example, impregnated with an epoxy resin, and with the inflatable application system (2) of each assembly deflated, the train is pulled towards one of the ends of the ducts by means of a cable (20) or similar device in the direction of the arrow ($f_1$). The pressurized fluid is fed into said systems (2) of the assemblies ($E_1, E_2, E_3 \ldots E_n$) by the ducts (7) having at least one control valve (11). The electric heating is possibly started up by the wiring (8) in all the assemblies ($E_1, E_2, E_3 \ldots E_n$). All the sheaths ($1_1, 1_2, 1_3 \ldots 1_n$) are applied simultaneously and adhere to the inner wall of the duct (C) at the same time. With total or partial polymerization of the resin, as the case may be, the systems (2) are deflated, the electric heating is stopped and said train is withdrawn from the duct (C) by the cable (21) for example. The distance ($a_1$) between two successive assemblies (E) is slightly less than the length (a) of an assembly (E). The assemblies ($E_1, E_2, E_3 \ldots E_n$) are then again loaded with sheaths and the train drawn towards the end of the duct (C) and stopped when each assembly ($E_1, E_2, E_3 \ldots E_n$) carrying a sheath is between two sheaths ($1_1, 1_2, 1_3 \ldots 1_n$) already firmly and finally applied to the inner wall of the duct (C).

The newly introduced sheaths are then applied to the inner wall of the duct (C) by inflating the systems (2) and starting up the heating if such be the case. When these newly introduced sheaths adhere to said wall of the duct (C), the systems (2) are deflated, the heating is stopped and the train is withdrawn. Since the distance ($a_1$) between two assemblies (E) is less than the length (a) of each assembly, the successive sheaths slightly ovelap and no sealing problem exists. These operations are repeated as often as necessary for lining the whole of the duct.

Figure 4:
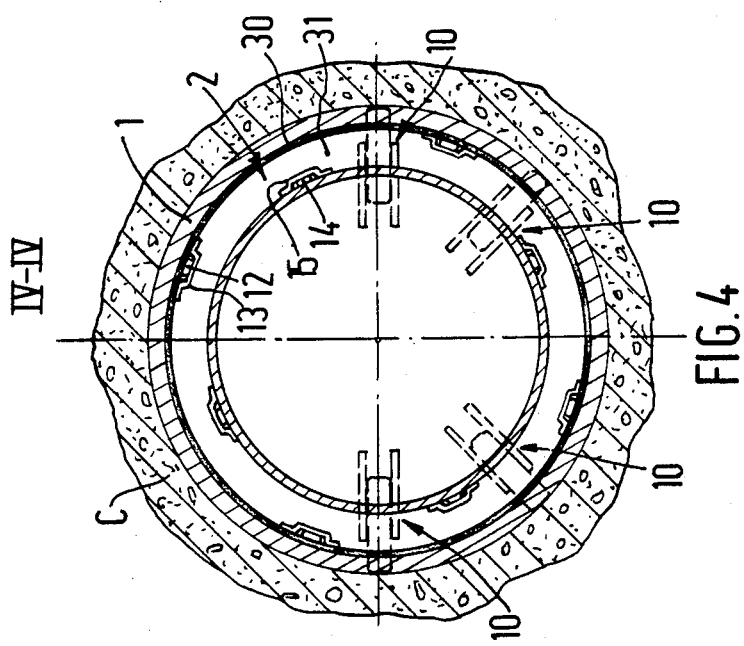
FIG. 4 is a section through line IV—IV of FIG. 3.
Figure 3:
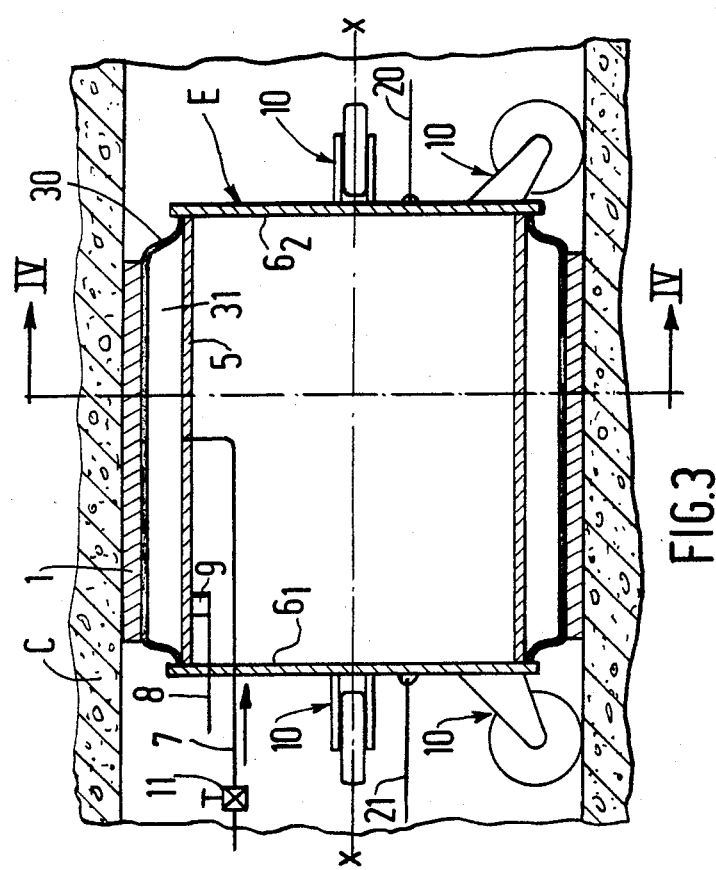
FIG. 3 shows schematically, in longitudinal section, a second embodiment of said assembly.

In the embodiment shown in FIGS. 3 and 4, the inflatable system (2) for applying this sheath (1) to said wall of the duct (C) is formed by a sheet (30) which is sealingly fixed at its longitudinal ends to sleeve 5, for example by welding, by bonding or by any mechanical means known per se. An inflatable space (31) is thus created between the sheet (30) and the outer wall of the sleeve (5). Electric heating means (12, 13) may be fixed to the inner wall of this sheet (30) and other electric heating means (14, 15) may be fixed to the outer wall of the sleeve (5). It is obvious that the process for internally lining a duct (C) by means of a train comprising several assemblies is also applicable to this embodiment.

Figure 6:
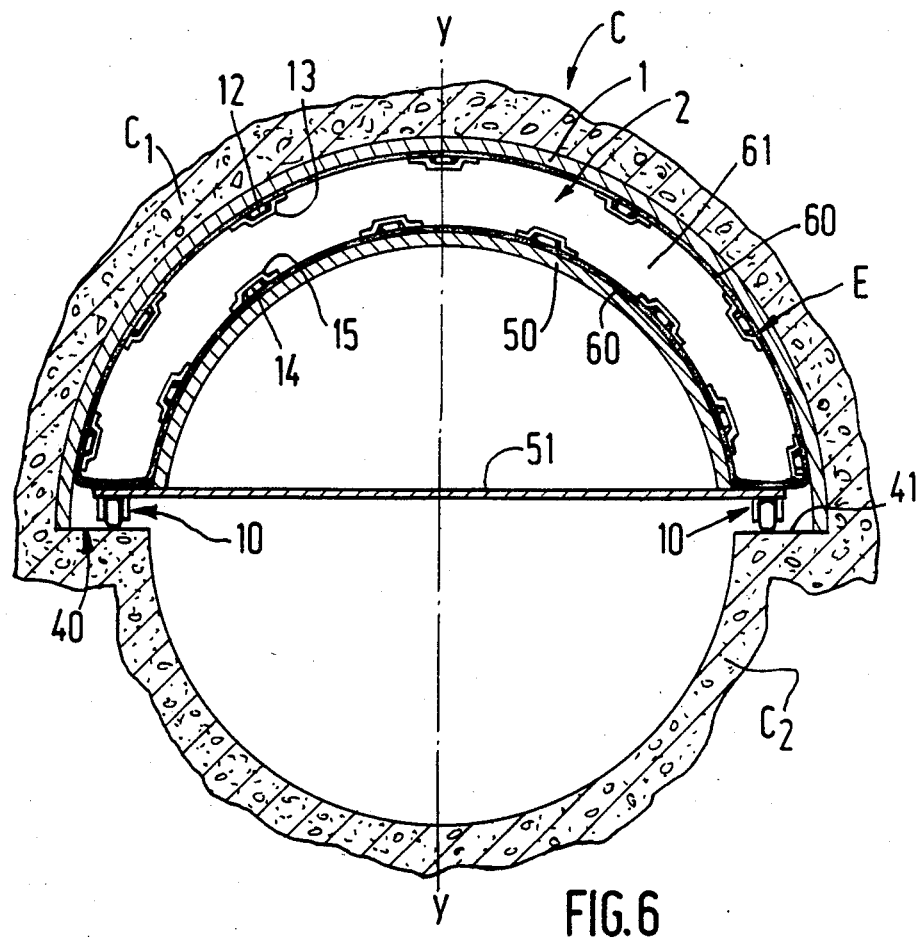
FIG. 6 shows schematically, in cross section, a duct being provided with an internal lining which has two parts, each of which has a different section.

A particularly interesting embodiment is shown in FIG. 6, which is relative to lining the inside of a duct (C) of which a part ($C_1$) has a larger section than the other part ($C_2$). Between the larger section part ($C_1$) and the other part ($C_2$), there exists a setback (40), the upper face of which forms a rolling path. In fact, in accordance with the process of the invention, first of all the part ($C_1$) is provided with an inner lining and the part ($C_2$) subsequently. For lining the part ($C_1$) of the duct (C), a first assembly ($E_6$) may be used comprising an inflatable system (2) for applying the sheath (1). This system may for example comprise an inflatable closed membrane (60) which encloses a space (61). Alternatively a flexible and sealing sheet (not shown in the drawings) may be fixed sealingly to the ends of the mold (half-sleeve) (50) for creating an inflatable space (61). Electric heating means (12, 13, 14, 15) may be fixedly mounted to the inner wall of said membrane (60), or they may be fixed to the inner wall of said sheet (12, 13) and, possibly, to the outer wall (14, 15) of the mold (50), (not shown in the drawings). The mold (50) is fixed to a plate (51) whose width is greater than that of the mold. At least two wheel carrying devices (10) are mounted at each of the ends of the assembly ($E_6$). However, other devices (10) may be mounted on said plate between the two ends of the assembly ($E_6$). The internal lining of the part ($C_1$) of the duct (C) is achieved in a way similar to that described above.

The method of a train comprising a plurality of assemblies ($E_6$) coupled to one another may also be used. The smaller part ($C_2$) of the duct (C) is lined similarly to the first larger part ($C_1$). This is, a mold is mounted on the plate (51) so as to conform to the shape of the lower part ($C_2$) of the duct (C). This mold carries an inflatable system for applying a sheath. This system is secured to the mold in any way known per se, if necessary. This sheath, for example impregnated with a resin, is disposed on said inflatable application system. Securing means are possibly provided for maintaining the sheath on said system so that it cannot move under the effect of excessive friction on the inner wall of the part ($C_2$) of the duct (C). The process for lining the inside of the part ($C_2$) of the duct (C) is thus substantially the same as the one described above. The parts of the sheaths not yet firmly applied to the walls of the parts ($C_1$) and ($C_2$) of the duct may be caused to adhere to the inner walls of the duct (C) by the inflatable application systems. Lining of the rolling path (41) may also be carried out manually.

This embodiment is more particularly applicable for the internal lining of sewers. Since the sewers are hot, it is possible to dispense with, at least partially, heating of the fluid and of the resin. In the drawings, the parts ($C_1$) and ($C_2$) of the duct (C) have semi-circular sections.

It comes within the scope of the invention to line ducts (C) having oval, square, rectangular, polyganol, etc parts ($C_1$) and ($C_2$). Of course, it is being understood that the molds and the inflatable application systems have sections which correspond to those of said parts ($C_1$) and ($C_2$) of the duct (C).

Numerous improvements and modifications may be made to the process and/or to the insulations for the internal lining of ducts without departing from the scope and spirit of the invention.

Thus, the sheaths may be formed from composite material comprising at least one layer of a non woven material made from natural or artificial fibers, for example from polyester. One or more strengthening layers may be provided which may be formed from any natural or synthetic material.

What is claimed is:

1. A process for internally lining a duct having a considerable size and length, said process comprising the following steps:
   (i) cleaning and descaling the inner wall of the duct;
   (ii) forming an initial sheath for lining the inside of the duct, said sheath being formed of a composite material and having a length less than the length of the duct to be lined, said material being at least partially impregnated with a resin which is polymerizable either before or after the formation of said sheath;
   (iii) applying heat to said sheath as required during at least the partial impregnation thereof with said resin;
   (iv) introducing said sheath into a part of the duct with an inflatable system for applying said sheath to a part of the inner wall of the duct, said system comprising a flexible and sealed sheet or membrane inside said sheath and having electric heating means in heat transfer relationship to the inner wall of said membrane, said sheath being disposed on the outer wall of said sheet for defining therewith an annular sealed space of said inflatable system, said system being in contact with an outer wall of a sleeve having a section compatible with the section of the duct and having sufficient rigidity so as not to collapse when a pressurized fluid is introduced into the sealed annular space, said sleeve being provided with mobile locating means for movement of the sleeve in the duct under the force of a pull exerted on one or other of the sleeve ends, and a mobile assembly comprised of said sleeve and inflatable system;
   (v) inflating said system by means of a pressurized fluid to apply said sheath against said part of the inner wall of the duct;
   (vi) energizing said heating means during inflation of said system as required to increase the temperature and speed up the polymerization of the resin;
   (vii) deflating and withdrawing said system after at least partial polymerization of the resin with the sheath adhering to the inner wall of the duct; and
   (viii) repeating the steps of forming, heating, introducing, inflating, energizing, deflating and withdrawing for other successive sheaths to be introduced into other successive parts of the duct and applied against other parts of the inner wall of the duct in a way identical to that described in points (i) to (vii) above, so as to provide a complete lining of the duct, and making the juncture between adjacent sheaths fluid tight; and
   several of said mobile assemblies and associated initial sheaths being disposed in the duct and connected together, the distance between two adjacent assemblies being slightly less than the length of an assembly, the train thus formed being moved in the duct for substantially simultaneous application of said initial sheaths to the inner wall of the duct, the parts of the inner wall of the duct between two adjacent assemblies being provided with sheaths during a second operation when each of the assemblies is loaded with a successive sheath while the train is in a position withdrawn from the duct after application of said initial sheaths to the inner wall of the duct.

2. The process of claim 1, wherein the inner face of said sheaths is smooth and fluid tight, and wherein said sheaths conform to the inner wall configuration of the duct.

3. A process for internally lining a duct in discrete connected adjacent sections, the duct being made from any material such as concrete, ceramic, metal, plastic materials, or glass, and whose sections may take on any shape and have a considerable size and length, said process comprising the following steps:
   (i) cleaning and descaling the inner wall of the duct;
   (ii) forming at least a first sheath for lining the inside of the duct, said sheath being formed of a composite material and having a length less than the length of the duct to be lined, said material being at least partially impregnated with a resin which is polymerizable either before or after the formation of said sheath;
   (iii) heating said sheath during at least the partial impregnation thereof with said resin;
   (iv) introducing said first sheath into at least one part of the duct with an inflatable system for applying said sheath to the inner wall of the duct, said system comprising a flexible and sealed sheet or membrane inside said sheath and having electric heating means mounted fixedly to at least the inner wall of said membrane;
   (v) inflating said system by means of a pressurized fluid to apply said sheath against at least a first part of the inner wall of the duct;
   (vi) energizing said heating means during inflation of said system to increase the temperature and speed up the polymerization of the resin;
   (vii) deflating and withdrawing said system after at least partial polymerization of the resin with the sheath adhering to the inner wall of the duct, the inner face of said sheath being smooth and fluid tight;

(viii) forming a second sheath substantially identical to said first sheath in the same way as said first sheath and introducing said second sheath with said inflatable system into said first part of the duct near to said first sheath, and inflating said system to apply said second sheath against the inner wall of the duct utilizing said heating means during inflation of said system, and deflating and withdrawing said system after at least partial polymerization of the resin;

(ix) repeating the steps of forming, heating introducing, inflating, energizing, deflating and withdrawing for other successive sheaths to be introduced and applied against at least said first part of the inner wall of the duct until the whole of at least said part of the duct is provided with an inner lining, junctions between said successive sheaths being made fluid tight; and (x) repeating the steps of forming, heating, introducing, inflating, energizing, deflating and withdrawing for other successive sheaths to be introduced into other successive parts of the duct and applied against the inner wall of these parts of the duct in a way identical to that described in paragraphs (ii) to (ix) above, so as to provide a complete lining of the duct with said discrete sections;

said sheaths for at least partial lining of the inside of the duct and which are at least partially impregnated with a resin being disposed on the outer wall of said sheet which defines an annular sealed space of said inflatable system, said system being in contact with the outer wall of a sleeve having a section compatible with the section of the duct and having sufficient rigidity so as not to collapse when a pressurized fluid is introduced into the sealed annular space defined at least partially by said sheet of said system; said sleeve being provided with at least two wheels at each of its ends so as to be mobile in the duct under the force of a pull exerted on one or other of its ends for application of said sheaths to the inner wall of the duct by the action of the pressurized fluid introduced into said sealed assembly; and several mobile assemblies, each of which comprise a sleeve, an inflatable application system, and the sheaths, which are disposed in the duct and connected together, the distance between two assemblies being slightly less than the length of an assembly, the train thus formed being moved in the duct for substantially simultaneous application of the first lining sheaths carried by the mobile assemblies, each of which comprise a sleeve and an inflatable application system forming the train to the inner wall of the duct; the parts of the inner wall of the duct between two assemblies being provided with sheaths, subsequently, during a second operation, when each of the assemblies, each of which comprise a sleeve and an inflatable application system loaded with a second sheath while the train is in a position withdrawn from the duct after application of said first sheaths to the inner wall of the duct.

4. A process for internally lining a duct in discrete connected adjacent sections, the duct being made from any material such as concrete, ceramic, metal, plastic materials, or glass, and whose section may take on any shape and have a considerable size and length, said process comprising the following steps:

(i) cleaning and descaling the inner wall of the duct;

(ii) forming at least a first sheath for lining the inside of the duct, said sheath being formed of a composite material and having a length less than the length of the duct to be lined, said material being at least partially impregnated with a resin which is polymerizable either before or after the formation of said sheath;

(iii) heating said sheath during at least the partial impregnation thereof with said resin;

(iv) introducing said first sheath into at least one part of the duct with an inflatable system for applying said sheath to the inner wall of the duct, said system comprising a flexible and sealed sheet or membrane inside said sheath and having electric heating means mounted fixedly to at least the inner wall of said membrane;

(v) inflating said system by means of a pressurized fluid to apply said sheath against at least a first part of the inner wall of the duct;

(vi) energizing said heating means during inflation of said system to increase the temperature and speed up the polymerization of the resin;

(vii) deflating and withdrawing said system after at least partial polymerization of the resin with the sheath adhering to the inner wall of the duct, the inner face of said sheath being smooth and fluid tight;

(viii) forming a second sheath substantially identical to said first sheath in the same way as said first sheath and introducing said second sheath with said inflatable system into said first part of the duct near to said first sheath, and inflating said system to apply said second sheath against the inner wall of the duct stabilizing said heating means during inflation of said system, and deflating and withdrawing said system after at least partial polymerization of the resin;

(ix) repeating the steps of forming, heating introducing, inflating, energizing, deflating and withdrawing for other successive sheaths to be introduced and applied against at least said first part of the inner wall of the duct until the whole of at least said part of the duct is provided with an inner lining, junctions between said successive sheaths being made fluid tight; and (x) repeating the steps of forming, heating, introducing, inflating, energizing, deflating and withdrawing for other successive sheaths to be introduced into other successive parts of the duct and applied against the inner wall of these parts of the duct in a way identical to that described in paragraphs (ii) to (ix) above, so as to provide a complete lining of the duct with said discrete sections;

and wherein the part of the duct to be provided with an inner lining comprises a cross-section, said cross-section being provided with at least two sections of different radial extent from the center of the duct, at least one larger section and at least one smaller section, and wherein the lining is effected essentially in the following steps, the first three of these steps being able to be carried out in any order:

(i) forming a partial sheath for lining and wherein the part of the duct having the larger section with a complex material impregnated at least with resin and shaped so as to be able to be applied to the part of the inner wall of the duct to be provided with a lining, placing said partial sheath on an inflatable application system disposed on a sleeve whose section is smaller than but whose configuration is substantially identical to the section of said part of the duct, said sleeve comprising a base plate having a width greater than the largest width of the part of the sleeve carrying said inflatable system and said sheath, said system comprising a flexible elastic sheet forming part of a closed membrane; mounting at least two wheels on the edges of said base plate at least at each longitudinal end of the plate, thus making the assembly which is composed of the sleeve, the inflatable application system, and the sheath, mobile in said part of the duct under the action of a pulling force exerted in the direction of the longitudinal axis of the duct, said wheels being placed on set backs between the larger section and the smaller section of the duct, these set backs forming rolling paths; hitching several assemblies, which are comprised of a sleeve, an inflatable application system and the sheath, to one another for simultaneous application of several sheaths to the part of the inner wall of the duct; introducing a pressurized fluid into said application system while heating said fluid and the resin by electrical means to apply each of said sheaths to the wall of the duct by means of the elastic sheet during inflating of the closed membranes of the respective assemblies until the resin has been at least partially polymerized; deflating said inflatable systems when the sheaths adhere to the inner wall of said part of the duct and withdrawing the train comprising several mobile assemblies from the duct; leading the assemblies again with sheaths impregnated at least partially with resin for continuing lining said part of the duct; and repeating these operations until said part of the duct is completely lined;

(ii) repeating the steps described above in point (i) to apply a lining to the part of the duct having the smaller section;

(iii) applying manually a sheath lining to the rolling path part of the duct;

(iv) applying manually to the walls of the duct those parts of the sheaths not affected by the action of the inflatable system; and (v) sealing the junctions between the different sheath parts in the duct.

5. The process of claim 4, wherein the sheaths for at least partial lining of the inside of the duct and which are at least partially impregnated with a resin are disposed on the outer wall of said sheet which defines an annular sealed space of said inflatable system, said system being in contact with the outer wall of a sleeve having a section compatible with the section of the duct and having sufficient rigidity so as not to collapse when a pressurized fluid is introduced into the sealed annular space defined at least partially by said sheet of said system; said sleeve being provided with at least two wheels at each of its ends so as to be mobile in the duct under the force of a pull exerted on one or other of its ends for application of said sheaths to the inner wall of the duct by the action of the pressurized fluid introduced into said sealed assembly.

6. The process of claim 5, wherein said sealed system is in the form of a closed sealed annular membrane made from a flexible elastic material; and wherein said electric heating means are disposed on the inner walls of said membrane; and said membrane is in controlled communication with a pressurized fluid source.

7. The process of claim 5, wherein said inflatable sealed system is defined by the outer wall of said sleeve and by said sheet, said sheet being elastic and having front and rear ends fixedly and sealingly connected to said outer wall of said sleeve; and wherein said electic heating means are disposed on the inner wall of said sheet and on the outer wall of said sleeve; and said sealed space is in controlled communication with a pressurized fluid source.

8. The process of claim 4, wherein said electric heating means are in the form of heating ribbons disposed inside longitudinal channels associated with the inner wall of said membrane.

9. The process of claim 4, wherein said sleeve is at least partially made from a synthetic material and is provided with a strengthening layer; said sleeve having a thickness conferring thereon sufficient rigidity to prevent it from collapsing during application of the sheaths against the inner wall of the duct.

10. The process of claim 4, wherein said sleeve is made from a metal material.

11. The process of claim 4, wherein the composite material of said sheaths comprises an outer layer made from an unwoven glass fiber material, an intermediate strengthening layer made from a glass fiber, and a second layer made from an unwoven glass fiber material disposed at the other side of the strengthening layer.

12. The process of claim 7, wherein said electric heating means are in the form of heating ribbons disposed inside longitudinal channels associated with the inner wall of said sheet and to the outer wall of said sleeve.

13. The process of claim 9, wherein said sleeve is integrated in a metal structure.

14. The process claim 9, wherein said synthetic material is polyvinyl.

15. The process of claim 11, wherein the composite material of said sheaths comprise a flexible plastic sheet sealingly connected to the second lower layer of unwoven glass fiber material.

16. The process of claim 4, wherein the thickness of said sheaths is between 25 to 30 μm.

17. The process of claim 4, wherein the thickness of said sheaths is between 10 to 45 mm, and the duct has a diameter of approximately 800 mm.

18. The process of claim 4, wherein several of said mobile assemblies and associated initial sheaths are disposed in the duct and connected together, the distance between two adjacent assemblies being slightly less than the length of an assembly, the train thus formed being moved in the duct for substantially simultaneous application of said initial sheaths to the inner wall of the duct, the parts of the inner wall of the duct between two adjacent assemblies being provided with sheaths during a second operation when each of the assemblies is loaded with a successive sheath while the train is in a position withdrawn from the duct after application of said initial sheaths to the inner wall of the duct.

* * * * *